United States Patent
Song et al.

(10) Patent No.: US 11,743,561 B2
(45) Date of Patent: Aug. 29, 2023

(54) IMAGE DISPLAY DEVICE, LIP-SYNC CORRECTION METHOD THEREOF, AND IMAGE DISPLAY SYSTEM

(71) Applicant: LG ELECTRONICS INC., Seoul (KR)

(72) Inventors: In Sun Song, Seoul (KR); Young Do Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/764,062

(22) PCT Filed: Sep. 25, 2019

(86) PCT No.: PCT/KR2019/012455
§ 371 (c)(1),
(2) Date: Mar. 25, 2022

(87) PCT Pub. No.: WO2021/060578
PCT Pub. Date: Apr. 1, 2021

(65) Prior Publication Data
US 2022/0377437 A1 Nov. 24, 2022

(51) Int. Cl.
*H04N 21/8547* (2011.01)
*H04N 21/439* (2011.01)

(52) U.S. Cl.
CPC ....... *H04N 21/8547* (2013.01); *H04N 21/439* (2013.01)

(58) Field of Classification Search
CPC ............. H04N 21/8547; H04N 21/439; H04N 21/4341; H04N 21/43615; H04N 21/4307
See application file for complete search history.

(56) References Cited

U.S. PATENT DOCUMENTS

| | | | | |
|---|---|---|---|---|
| 8,904,289 B2* | 12/2014 | Strober | ................. | H04N 21/40 715/740 |
| 9,013,632 B2* | 4/2015 | Yao | ...................... | H04N 21/431 348/518 |
| 9,338,391 B1* | 5/2016 | Greene | ............ | H04N 21/41265 |
| 2007/0024746 A1* | 2/2007 | Cole | ........................ | H04N 5/04 348/706 |
| 2009/0073316 A1* | 3/2009 | Ejima | ....................... | H04N 5/04 348/739 |
| 2009/0091655 A1* | 4/2009 | Russell | ............ | H04N 21/43072 348/E5.009 |
| 2013/0002950 A1* | 1/2013 | Thompson | ....... | H04N 21/44004 348/E5.009 |

* cited by examiner

*Primary Examiner* — Oschta I Montoya
(74) *Attorney, Agent, or Firm* — Lee, Hong, Degerman, Kang & Waimey PC

(57) ABSTRACT

An image display device, a lip-sync correction method thereof, and an image display system thereof are proposed. The lip-sync correction method of the image display device includes: receiving an audio delay measurement command from a user; transmitting an audio detection command to a remote control device and outputting a pre-stored test signal to an external speaker; calculating an audio delay value by comparing an audio signal received from the remote control device with the test signal; and correcting a decoding time stamp of an image signal on the basis of the audio delay value. Accordingly, it is possible to match lip-synching of video and audio in response to various external audio outputs or external audio devices.

11 Claims, 6 Drawing Sheets

FIG. 4

| Audio output\\Input source | Reference lip sync | HDMI (ARC) | HDMI (Audio device1) | Bluetooth (Speaker1) | ... |
|---|---|---|---|---|---|
| DTV | 50 | 60 | ... | ... | ... |
| ATV | 60 | 70 | ... | ... | ... |
| Cable source | 40 | 50 | ... | ... | ... |
| HDMI (STB) | 30 | 30 | ... | ... | ... |
| HDMI (DVD Player1) | ... | ... | ... | ... | ... |
| HDMI (Game device1) | ... | ... | ... | ... | ... |
| Component source | ... | ... | ... | ... | ... |
| USB | ... | ... | ... | ... | ... |
| Network source | ... | ... | ... | ... | ... |
| ... | ... | ... | ... | ... | ... |

IMAGE DISPLAY DEVICE, LIP-SYNC CORRECTION METHOD THEREOF, AND IMAGE DISPLAY SYSTEM

CROSS-REFERENCE TO RELATED APPLICATIONS

This application is the National Stage filing under 35 U.S.C. 371 of International Application No. PCT/KR2019/012455, filed on Sep. 25, 2019, the contents of which are all incorporated by reference herein in their entirety.

TECHNICAL FIELD

The present disclosure relates to an image display device, a lip-sync correction method thereof, and an image display system and, more particularly, to an image display device, a lip-sync correction method thereof, and an image display system thereof, which enable lip-synching between an image and audio output.

BACKGROUND ART

An image display device is a device that reproduces image content, and receives images from various sources and reproduces the images. The image display device is implemented by various devices such as a personal computer (PC), a smartphone, a tablet PC, a laptop computer, and a TV. Recently, the image display device such as a smart TV reproduces images by receiving the images not only from broadcasting, but also from various sources such as web content, game consoles, and DVDs.

Meanwhile, recently, cases of using an external sound device such as a home theater, a sound bar, and a Bluetooth speaker, which are connected to an image display device, are increasing. However, when connected to an external sound device, the image display device decodes, encodes, and then outputs audio signals to the external sound device, and the external sound device receives the encoded signals and outputs the decoded signals, so there is a delay in the audio output as much as the time taken for the encoding and decoding. Due to this delay, there is a problem in that lip-synching between image frames output from the image display device and the audio signals output through the external sound device does not match properly.

DISCLOSURE

Technical Problem

An objective of the present disclosure for solving the problem is to provide an image display device, a lip-sync correction method thereof, and an image display system thereof for matching lip-synching between video and audio when audio is output through an external audio device. In addition, another objective of the present disclosure for solving the problem is to provide an image display device, a lip-sync correction method thereof, and an image display system thereof for adjusting lip-synching between video and audio corresponding to types of external audio outputs and input sources.

Yet another objective of the present disclosure for solving the problem is to provide an image display device, a lip-sync correction method thereof, and an image display system thereof, which are capable of efficiently matching lip-synching between video and audio without increasing internal memory capacity. In addition, still another objective of the present disclosure for solving the problem is to provide an image display device, a lip-sync correction method thereof, and an image display system thereof, which are capable of automatically correcting lip-sync so that a user may easily adjust the lip-sync when the lip-synching between video and audio does not match.

Technical Solution

In order to solve the problems as described above, an image display device according to an exemplary embodiment of the present disclosure includes a control unit configured to store a test signal for correcting lip-sync in advance, output the test signal when an audio delay measurement command is input from a user, control to detect the test signal output through a connected external speaker by transmitting an audio detection command to a remote control device through a microphone of the remote control device, calculate an audio delay value by receiving and comparing the detected test signal with a timing of the pre-stored test signal, and correct a decoding time stamp of a video processing unit to be delayed by the audio delay value.

In addition, the video processing unit may include a CPB unit, a decoder, and a DPB unit, and the control unit delays compressed frame buffering of the CPB unit by the calculated audio delay value, correct a decoder's decoding timestamp to be delayed, and correct an output time stamp of a decoding frame of the DBP unit to be delayed.

The storage unit may include a lip-sync table for storing lip-sync values corresponding to each external input source and each audio output in addition to the test signal, and the control unit may correct the lip-sync value of the lip-sync table according to the calculated audio delay value, and control a decoding time and an output time of the video processing unit according to the corrected lip-sync value.

The image display device according to the exemplary embodiment of the present disclosure may further include a UI generating unit for generating a menu related to lip-sync correction, wherein the user may input the audio delay measurement command through the menu related to the lip-sync correction, and measure audio delay using an audio stream or a test stream with audio and video streams when the audio delay measurement command is input.

The remote control device according to the exemplary embodiment of the present disclosure may be provided with the microphone for detecting audio, activate the microphone when the audio detection command is input from the image display device, detect an audio signal for a predetermined time, and transmit the audio signal to the image display device in real time.

Advantageous Effects

As described above, the image display device, the lip-sync correction method thereof, and the image display system thereof according to the present disclosure may match lip-synching of video and audio in response to various external audio outputs or external audio devices.

As described above, the image display device, the lip-sync correction method thereof, and the image display system thereof according to the present disclosure may match lip-synching of video and audio in response to various input sources and external audio outputs.

The image display device, the lip-sync correction method thereof, and the image display system thereof according to the present disclosure may solve a mismatch of lip-sync simply by outputting an audio and video test stream and correcting the lip-sync when a user selects a menu related to lip-sync correction.

DESCRIPTION OF DRAWINGS

FIG. 4 is a view illustrating an example of a lip-sync table stored in a storage unit according to the exemplary embodiment of the present disclosure.

MODE FOR INVENTION

Figure 1:
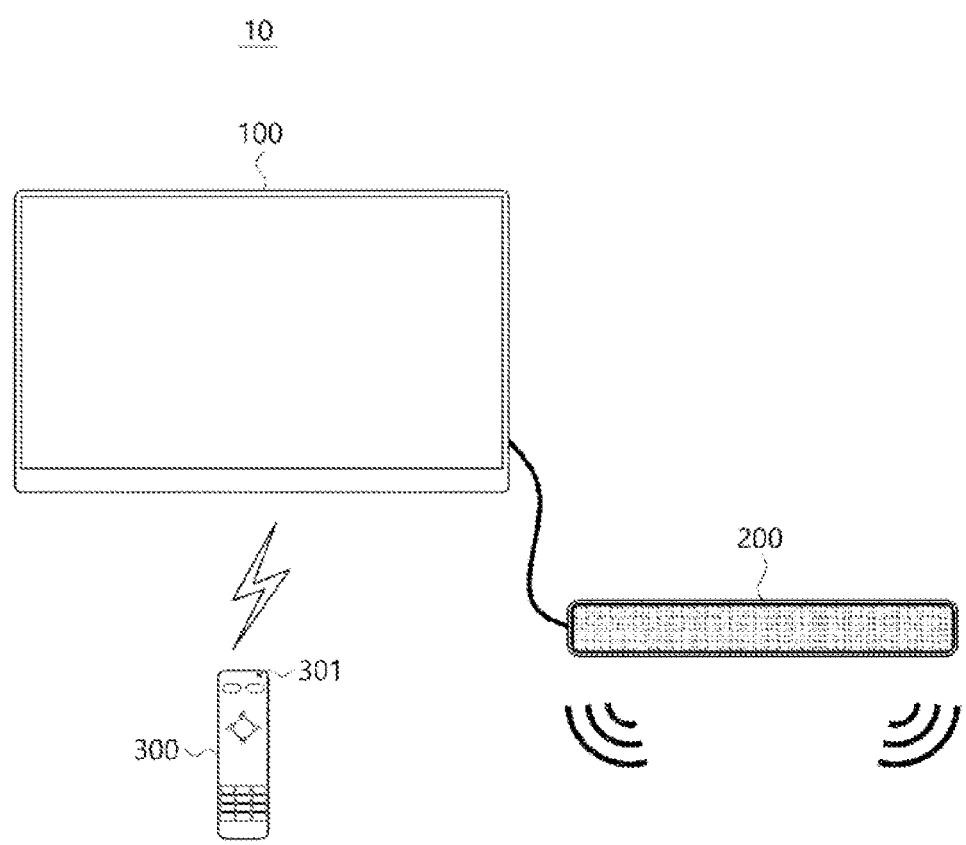
FIG. 1 is a view schematically illustrating an image display system according to an exemplary embodiment of the present disclosure.

Hereinafter, specific exemplary embodiments of the present disclosure will be described with reference to the drawings.

Advantages and features of the present disclosure, and a method of achieving them will become apparent with reference to the exemplary embodiments described below in detail together with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

FIG. 1 is a view schematically illustrating an image display system 10 according to the exemplary embodiment of the present disclosure. Referring to FIG. 1, the image display system 10 according to the exemplary embodiment of the present disclosure includes: an image display device 100, an external speaker 200, and a remote control device 300.

The image display device 100 according to the exemplary embodiment of the present disclosure may be one of various electronic devices having a display means. For example, the image display device 100 may include any of electronic devices such as a TV, a monitor, a computer, a tablet PC, and a mobile terminal, which are capable of receiving broadcasts. In the present exemplary embodiment, a TV having a function of receiving broadcasts will be described as an example of the image display device 100.

The image display device 100 processes a signal input from outside to output a video signal to a display unit 140, and outputs an audio signal through an internal speaker 161 or an external speaker 200. The image display device 100 controls output of video and audio on the basis of timing information received from inputs of a signal source and data for internal lip-sync control.

The external speaker 200 is connected to the image display device 100 through a wired or wireless network, so as to receive and output an audio signal from the image display device 100. The external speaker 200 includes a home theater speaker, a sound bar, a Bluetooth speaker, and the like. The external speaker 200 may have an audio processing module using a Dolby sound codec such as AC3. In this case, an encoded audio signal is received from the image display device 100, and is decoded and output through a speaker. In this way, when the external speaker 200 processes audio through a signal processing module such as a separate decoder, there is an advantage of providing high-quality audio, but there are many cases in which audio output delay occurs due to the decoding processing. In this case, there occurs a problem that lip-synching between a video signal and an audio signal does not match. In a case of the internal speaker 161, since an audio output time of the speaker 161 is known from the image display device 100, a lip-sync problem may be easily solved, but in a case of the external speaker 200, since the audio output time is unknown, it is difficult to conduct a lip-sync correction. The image display device 100 according to the present disclosure may calculate an audio delay value of the external speaker 200 by using a pre-stored test signal, and correct the lip-sync on the basis of the audio delay value.

The remote control device 300 is for receiving an input from a user and transmit an input signal to the image display device 100, and is provided with an RF module or infrared module capable of transmitting/receiving a signal with the image display device 100 in accordance with radio frequency (RF) or infrared communication standards. In addition, the image display device 100 may perform an operation corresponding to a user input entered from the remote control device 300. The remote control device 300 includes a microphone 301 for detecting an audio signal. The microphone 301 may receive an external audio signal by the microphone and process the external audio signal as electrical voice data. The microphone 301 receives an analog audio signal and converts the received analog audio signal into a digital audio signal. The analog audio signal received by the microphone 301 may also be converted into the digital audio signal through a separate analog-to-digital converter.

When an audio delay measurement command is input, the image display device 100 transmits an audio detection command to the remote control device 300 and outputs the pre-stored test signal, so as to allow the remote control device 300 to detect output audio of the test signal. The remote control device 300 may convert the audio signal detected by the microphone 301 in accordance with the transmission communication standards to transmit the converted audio signal to the image display device 100, and the image display device 100 may calculate the audio delay value by comparing the pre-stored test signal and the detected audio signal.

Figure 2:
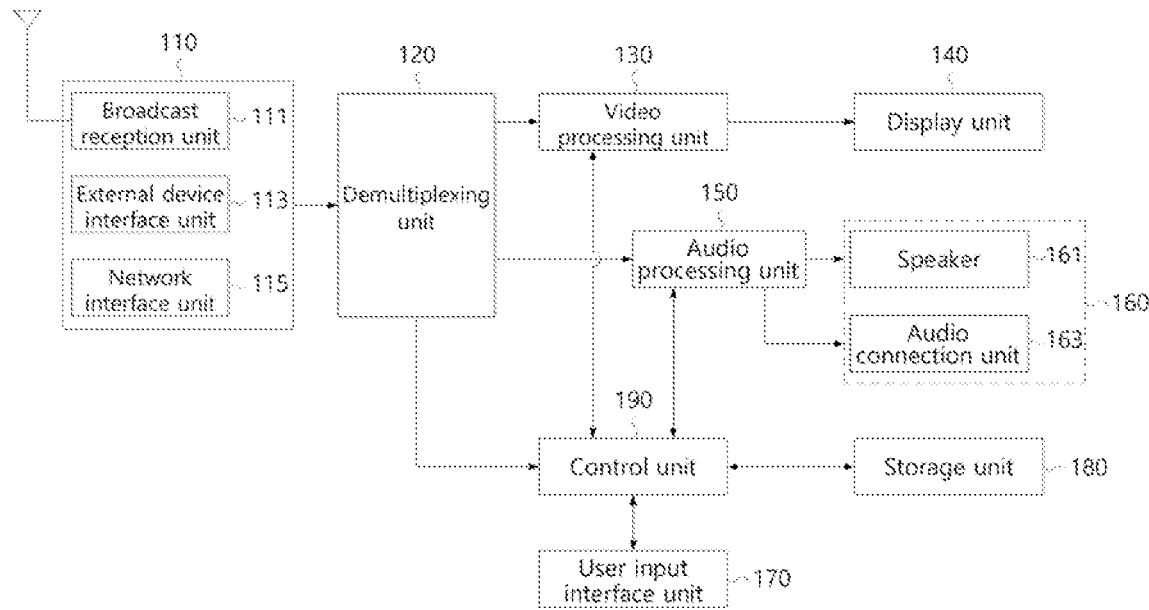
FIG. 2 is a control block diagram of an image display device according to the exemplary embodiment of the present disclosure.

The image display device 100 according to the present disclosure will be described in detail with reference to FIG. 2. FIG. 2 is a control block diagram of the image display device 100 according to the exemplary embodiment of the present disclosure. Referring to FIG. 2, the image display device 100 according to the exemplary embodiment of the present disclosure includes a signal receiving unit 110, a demultiplexing unit 120, a video processing unit 130, a display unit 140, an audio processing unit 150, an audio output unit 160, a user input interface unit 170, a storage unit 180, and a control unit 190.

The signal receiving unit 110 is for receiving signals from various external devices, and may include: a broadcast reception unit 111 for receiving a broadcast signal, an external device interface unit 113 for connecting to an external device, and a network interface unit 115 for connecting to the Internet.

The broadcast reception unit 111 may include: an RF tuner for receiving an RF broadcast signal, performing channel tuning, and outputting an IF signal; and a demodulator for demodulating the IF signal converted by the RF tuner.

The external device interface unit 113 may include, for example, a High Definition Multimedia Interface (HDMI) connector for receiving content from a PC, a set-top box, or a multimedia playback device, a component video connector, a composite video connector, a D-sub connector, and the like. In addition, the signal receiving unit 110 may include a USB port or a memory card slot.

The network interface unit 115 includes a communication module for connecting to a wired/wireless network including the Internet network. The network interface unit 115 is provided with an Ethernet terminal for connecting to a wired network, or may use Wireless LAN (WLAN, i.e., Wi-Fi), Wireless broadband (Wibro), World Interoperability for Microwave Access (Wimax), and High Speed Downlink Packet Access (HSDPA) communication standards, and the like for connecting to a wireless network.

The demultiplexing unit 120 separates a video signal and an audio signal from the signal received through the signal receiving unit 110 and outputs the video signal and audio signal.

The video processing unit 130 is for receiving and processing the video signal output through the demultiplexing unit 120. For example, video and broadcast information of broadcast signals, game video, Internet content video and content information, and the like are processed and stored in a size and image quality suitable to be displayed on the display unit 140. The video processing unit 130 may include a decoder for decoding an encoded video, a scaler, a memory for temporarily storing video frames and information, and a processor for executing a video processing program.

The display unit 140 is for displaying an image on a screen, and may be implemented by a liquid crystal display (LCD) panel, a light-emitting diode (LED) panel, and an organic light-emitting diode (OLED) panel, or the like. The display unit 140 includes a display module for displaying images and a display driver for driving the display module.

The audio processing unit 150 is for receiving and processing the audio signal output through the demultiplexing unit 120 or an audio signal included in a video or content, and may include a decoder and an encoder.

The audio output unit 160 is for receiving and outputting the audio signal processed by the audio processing unit 150, and may include various types of speakers 161 and audio connection units 163. The audio connection unit 163 is for connecting to the external speaker 200, and may include various communication modules such as a connector for transmitting audio signals and a communication module, that is, for example, an HDMI (ARC) connector terminal and a Bluetooth module. When the audio connection unit 163 includes a wireless communication module, for example, the Bluetooth module, the Bluetooth module converts the audio signal output from the audio processing unit 150 into a wireless data signal, for example, an RF signal, and transmits the wireless data signal to the connected external speaker 200.

The user input interface unit 170 is for interworking with the remote control device 300, and may be provided with at least one or more of various communication modules that utilize Bluetooth, Ultra-Wideband (WB), a ZigBee method, a radio frequency (RF) communication method, an infrared (IR) communication method, or wireless fidelity (WI-FI).

The audio connection unit 163 and the user input interface unit 170 may use one wireless communication module in common. For example, one Bluetooth communication module may be commonly used by the audio connection unit 163 and the user input interface unit 170.

The storage unit 180 is for storing the test signal for audio delay measurement, and may be implemented by an electrically erasable programmable read-only memory (EEPROM) that is capable of reading and writing, a hard disk drive (HDD) that is a mass storage medium, and the like. The storage unit 180 stores a lip-sync table for video/audio lip-sync values corresponding to each input source. In addition, the storage unit 180 may store various operating systems (OS), middleware, platforms, various applications of the image display device 100, and programs for signal processing and control.

The control unit 190 serves to perform overall control of the image display device 100 according to a user command input through the user input interface unit 170 or an internal program. According to an image reproduction command from a user, the control unit 190 may process a video signal and/or an audio signal, which are received from the signal receiving unit 110, so as to control the video signal and/or the audio signal to be output to the display unit 140 and/or the audio output unit 160. The control unit 190 may be implemented by including a program code for signal processing and control, a memory storing the same, and a processor executing the same.

The control unit 190 corrects lip-sync between a video output and an audio output through audio delay measurement. When an audio delay measurement command is input from the remote control device 300, the control unit 190 transmits an audio detection command to the remote control device 300 and controls a test signal stored in the storage unit 180 to be transmitted to the audio output unit 160. When receiving the audio detection command, the remote control device 300 controls the microphone 301 to detect the output audio of the test signal output through the audio output unit 160, and transmits in real time the detected audio signal to the remote control device 300 for a predetermined time. The control unit 190 receives the audio signal from the remote control device 300, calculates an audio delay value by comparing timings of the audio signal and the test signal, and controls video processing or an output time of the video processing unit 130 on the basis of the calculated audio delay value. When the audio signal is output through the internal speaker 161, lip-synching is rarely mismatched, so in many cases, the lip-sync adjustment by the audio delay measurement is mainly performed when the audio signal is output through the external speaker 200. The control unit 190 allows the test signal to be output to an audio output means currently set as an audio output.

Figure 3:
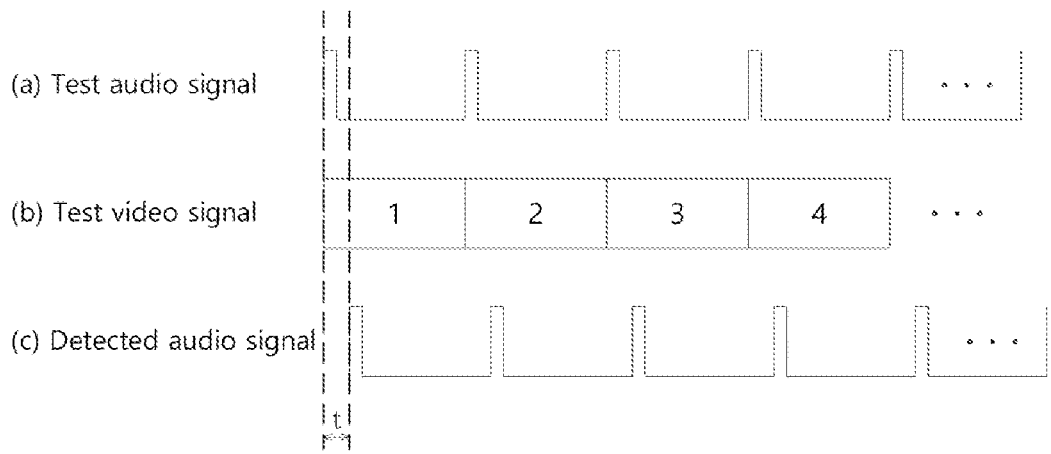
FIG. 3 is a view for describing audio delay measurement of the image display device according to the exemplary embodiment of the present disclosure.

FIG. 3 is a view for describing audio delay measurement of the image display device 100 according to the exemplary embodiment of the present disclosure. The test signal, which is a reference signal for measuring audio delay, may be composed of only an audio stream, or may include an audio stream and a video stream. In this case, even when the test signal includes only the audio stream, there is no problem in measuring audio delay. Whereas, when the test signal includes both the audio and video streams, there is an advantage that a user may be able to recognize a level of the audio delay through an output screen and audio.

In FIG. 3, a view is exemplified that the test signal is composed of audio and video streams. The test signal may be configured to include an audio stream and a video stream having a predetermined streaming time, for example, 5 to 10 seconds. The control unit 190 has reference timing information related to the output of the test signal, and calculates a difference between output timings of audio signals detected from the microphone 301 of the remote control device 300 as an audio delay value. In FIG. 3, a timing difference between the test signal and the detected audio signal differs by a value t, and the control unit 190 calculates the value t as the audio delay value. The control unit 190 corrects a value of the lip-sync table stored in the storage unit 180 on the basis of the audio delay value.

FIG. 4 is a view illustrating an example of the lip-sync table stored in the storage unit 180 according to the exemplary embodiment of the present disclosure. The lip-sync table for video and audio output may be provided for respective types of input sources and external devices providing the input sources, or may be provided for respective types of audio connection units 163 and external speakers 200 respectively connected to the audio connection units 163. FIG. 4 illustrates each video lip-sync value as an example, and illustrates each video delay value based on audio. That is, FIG. 4 describes that a video signal is delayed and output by a value stored in the lip-sync table. In FIG. 4, the unit of each lip-sync value is msec, as an example.

Referring to FIG. 4, it is exemplified that the lip-sync table is arranged vertically for each input source and horizontally for each audio output. As an example of input sources, digital broadcasting (DTV), analog broadcasting (ATV), cable sources, HDMI (STB), and the like are exemplified, and as an example of audio outputs, HDMI (ARC), HDMI (audio device 1), Bluetooth (speaker 1), and the like are exemplified.

As shown in FIG. 4, in the video and audio output lip-sync values, a reference lip-sync value is set for each input source, and the reference lip-sync value is set on the basis of a lip-sync value applied when an audio signal is output through an internal speaker of the image display device 100. In addition, the lip-sync value set for each audio output connected through the audio connection unit 163 may be set or corrected by adding a value calculated according to the above-described audio delay measurement to the reference lip-sync value. For example, in a case where a current input source is HDMI (STB) and an audio output is HDMI (ARC), when the above-described audio delay value is calculated as 10 msec, the control unit 190 adds 10 msec to 30 msec, which is a reference lip-sync value of the corresponding input source in the lip-sync table, so that a lip-sync value corresponding to the relevant input source and the relevant audio output may be set or corrected to 40 msec. As described above, the embodiment of the present disclosure measures the audio delay by using the remote control device 300 even when the external speaker 200 is connected thereto, whereby the lip-sync mismatch problem may be solved. Meanwhile, the lip-sync table of FIG. 4 may be set or updated by a user or automatically in response to an input source and an audio output, which have a history of connection to the image display device 100.

Figure 5:
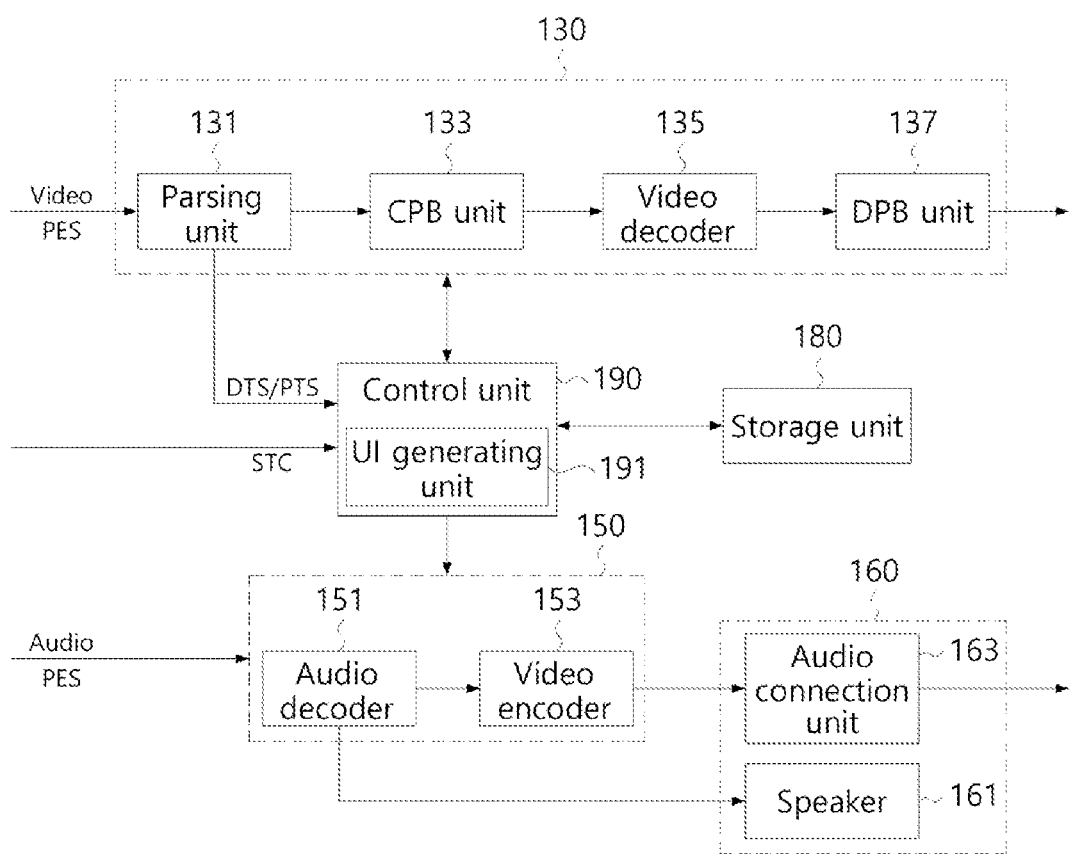
FIG. 5 is a view illustrating a detailed configuration of the image display device according to the exemplary embodiment of the present disclosure.

Hereinafter, the operation of the image display device 100 according to the exemplary embodiment of the present disclosure will be described in more detail with reference to FIG. 5. FIG. 5 illustrates a detailed configuration of the image display device 100 in FIG. 1. For convenience of illustration, in FIG. 3, illustration of the signal receiving unit 110, the demultiplexing unit 120, the display unit 140, and the user input interface unit 170 of the image display device 100 is omitted. In the present exemplary embodiment, the image display device 100 that processes a digital broadcast signal as an input source will be described as an example.

The transport stream (TS) of a received digital broadcast is demultiplexed through the demultiplexing unit 120, and is separated into a video stream and an audio stream to respectively output to the video processing unit 130 and the audio processing unit 150. In this case, the video stream and the audio stream may be in a form of a Packetized Elementary Stream (PES) packet, and a PES packet may be composed of a PES header and an elementary stream (ES).

The video processing unit 130 includes a parsing unit 131, a CPB unit 133, a video decoder 135, and a DPB unit 137. The parsing unit 131 parses an input video stream to extract a decoding time stamp (DTS), a presentation time stamp (PTS), and a compressed frame, so that the extracted compressed frame is output to a decoder and the DTS and PTS are provided to the control unit 190. The DTS and PTS are video reproduction information included in the PES header, and the compressed frame corresponds to the ES. The decoding time stamp (DTS) indicates decoding time information, and the presentation time stamp (PTS) indicates output time information.

The coded picture buffer (CPB) unit 133 is for receiving and temporarily storing the compressed frame output from the parsing unit 131, and is implemented by a buffer. The video decoder 135 decodes the elementary stream (ES) corresponding to the compressed frame output from the CPB unit 133 to sequentially generate frames. The decoded picture buffer (DPB) unit 137 is for temporarily storing the decoded frame output from the decoder and outputting the decoded frame to the display unit 140, and is implemented by a buffer.

The audio processing unit 150 includes an audio decoder 151 and an audio encoder 153. The audio decoder 151 extracts a compressed audio frame by parsing the audio stream received from the demultiplexing unit 120, restores the extracted audio frame to an original audio frame signal, and outputs the restored audio frame signal to a speaker. The audio encoder 153 re-encodes the audio frame signal restored through the audio decoder 151 and outputs the restored audio frame signal to the external speaker 200 through the audio connection unit 163. When the external speaker 200 connected to the audio connection unit 163, for example, the HDMI (Audio Return Channel, ARC) connector terminal has a Dolby sound codec such as AC3, the image display device 100 re-encodes and outputs the audio stream through the audio encoder 153. In some cases, the decoded audio signal may be output to the external speaker 200 without going through the encoding process of the audio encoder 153. For example, when the external speaker 200 is connected through the Bluetooth module, the stream decoded without going through the encoding process may be converted and output in accordance with the RF communication standards.

The control unit 190 controls the signal processing time and output time of the video processing unit 130 and the audio processing unit 150 on the basis of the DTS, PTS, STC, and lip-sync value. The system time clock (STC) may be generated from program clock reference (PCR) information output from the demultiplexing unit 120, and the control unit 190 compares the DTS and the PTS with each other on the basis of the STC to control the signal processing time and output time.

The control unit 190 corrects the DTS and PTS of a video stream on the basis of the values of the lip-sync table stored in the storage unit 180. Specifically, the control unit 190 checks a current input source and an audio output, and checks a corresponding lip-sync value in the lip-sync table of the storage unit 180. For example, when it is checked that the current input source is HDMI (STB) and the audio output is HDMI (ARC), the control unit 190 may check the corresponding lip-sync value (e.g., 40 msec) in the lip-sync table of the storage unit 180.

The control unit 190 corrects the DTS value input from the parsing unit 131 of the currently processed video signal by delaying 40 msec, which is a lip-sync value, so that the CPB unit 133 delays data buffering by the corrected DTS. Since the CPB unit 133 stores the compressed frame, data may be stored as much rate as the compression rate. Accordingly, even when the memory capacity of the CPB unit 133 is not increased, a sufficient amount of data may be efficiently buffered to delay the output time point. In contrast, because of storing decoded data, the DPB unit 137 may not be able to store a large amount of data with a limited memory capacity, so the embodiment of the present disclosure controls the output time point of the video frame compressed by the CPB unit 133 to be delayed as much as the corrected lip-sync value.

When STC increases to a value of the corrected DTS, that is, to a value of (DTS+lip-sync value 40 msec), the control unit 190 controls the video decoder 135 to proceed with decoding, and when STC increases to a value of the corrected PTS, that is, to a value of (PTS+lip-sync value 40 msec), the control unit 190 controls the output timing so that the DPB unit 137 outputs the decoded video frame to the display unit 140. As described above, the control unit 190 according to the present disclosure may measure the audio delay value of the connected external speaker 200 and correct the video buffering, decoding time point, output time point, and the like on the basis of the measured audio delay value, so as to perform the delay processing, whereby the lip-synching may be corrected.

Referring back to FIG. 5, the control unit 190 includes a UI generating unit 191. The UI generating unit 191 is for generating a menu for lip-synching, and a UI menu generated by the UI generating unit 191 is displayed on the display unit 140. A user may input an audio delay measurement command through the menu displayed on a screen.

Hereinafter, the lip-sync correction and control methods of the image display device 100 according to the exemplary embodiment of the present disclosure will be described with reference to FIGS. 6 and 7.

Figure 6:
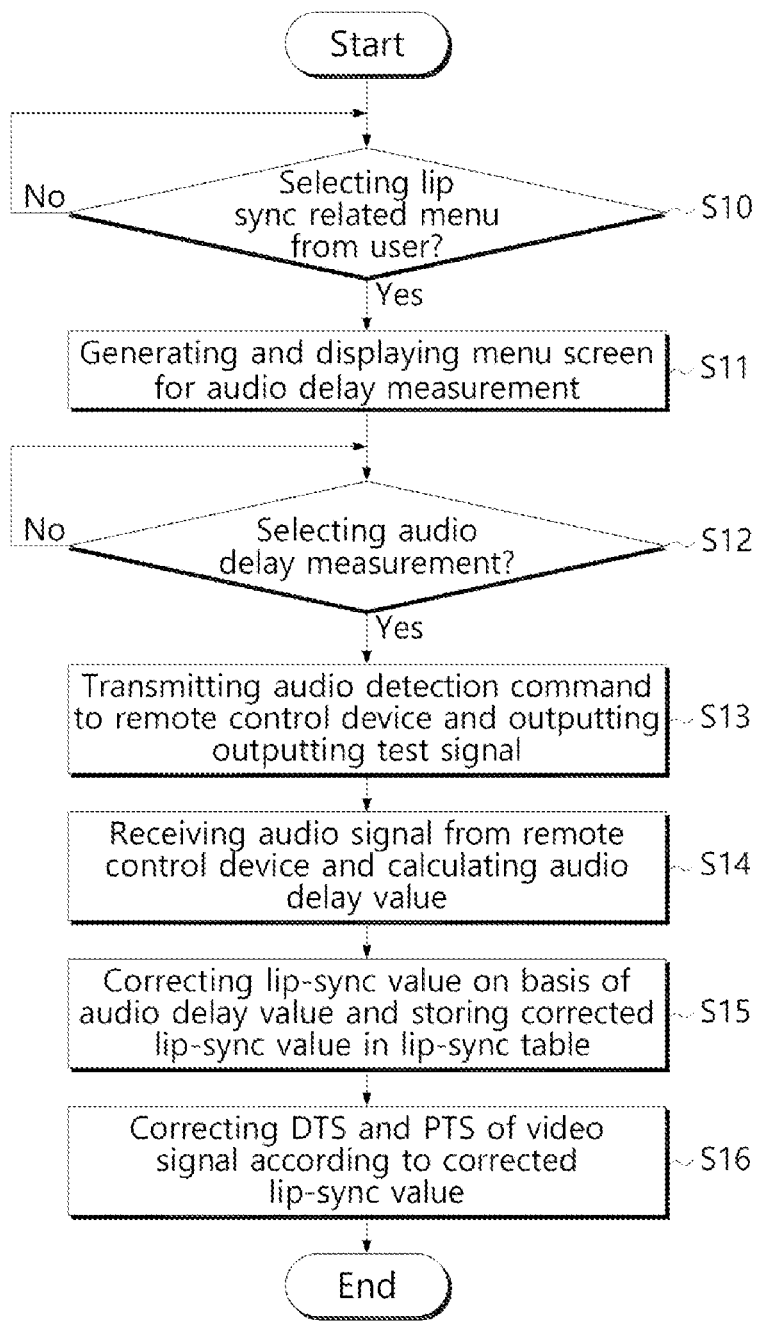
FIG. 6 is a flowchart illustrating a lip-sync correction method of the image display device according to the exemplary embodiment of the present disclosure.

FIG. 6 is a flowchart illustrating the lip-sync correction method of the image display device 100 according to the exemplary embodiment of the present disclosure. When lip-synching of a video output and an audio output does not match, a user may input a menu display command for the lip-synching through the remote control device 300. When the image display device 100 receives an input of the menu display command for the lip-synching from the remote control device 300 in step S10, the image display device 100 generates a menu screen related to audio delay measurement and displays the menu screen on a screen in step S11. When the user selects the audio delay measurement on the menu screen through the remote control device 300 in step S12, the control unit 190 transmits an audio detection command to the remote control device 300 and controls a test signal stored in the storage unit 180 to be output through the audio output unit 160 in step S13. When the audio output is set to an internal speaker, the audio is output through the internal speaker of the image display device 100, and when the external speaker 200 is connected through the audio connection unit 163, the test signal is output through the corresponding external speaker 200. In addition, when the test signal includes a video stream, a video signal is also output through the display unit 140.

When receiving an audio detection command, the remote control device 300 controls the microphone 301 to detect an audio signal, and transmits the detected audio signal to the remote control device 300 in real time for a predetermined time. The detection time may be set to, for example, 5 to 10 seconds. The remote control device 300 detects the audio output of the test signal by activating the function of the microphone 301 for a predetermined time according to the audio detection command. In step S14, the control unit 190 receives the detected audio signal from the remote control device 300 and compares timings of the detected audio signal and the test signal to calculate an audio delay value. In addition, in step S15, the control unit 190 corrects the lip-sync value corresponding to the relevant input source and the relevant audio output on the basis of the calculated audio delay value. In addition, in step S16, signal processing is performed by correcting the DTS and PTS of the video signal according to the corrected lip-sync value for the signal received from the currently selected input source, so as to correct the lip-synching of the video and audio.

Figure 7:
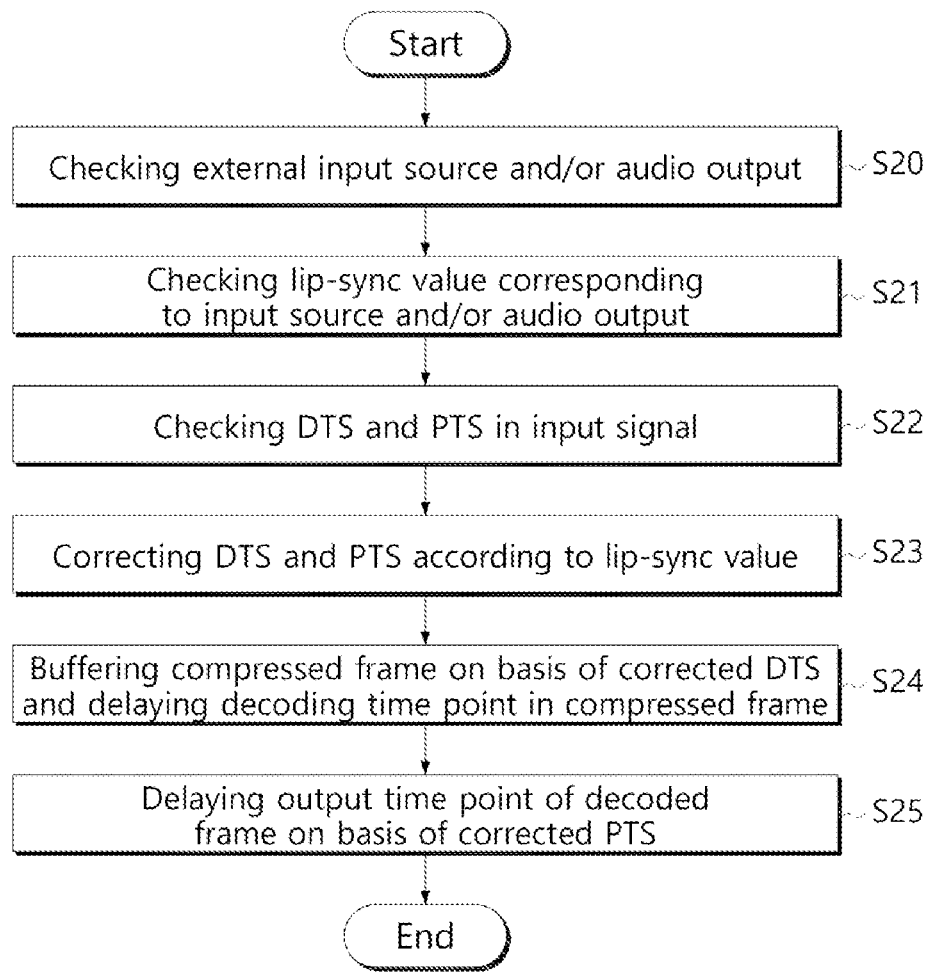
FIG. 7 is a flowchart illustrating a lip-sync control method of the image display device according to the exemplary embodiment of the present disclosure.

FIG. 7 is a flowchart illustrating the lip-sync control method of the image display device 100 according to the exemplary embodiment of the present disclosure. Referring to FIG. 7, in step S20, the control unit 190 checks the lip-sync value corresponding to the currently selected input source and audio output. In addition, in step S21, reproduction information such as DTS and PTS is checked from a video stream extracted through the parsing unit 131. In step S22, the control unit 190 corrects the DTS and the PTS according to the lip-sync value checked in the lip-sync table. For example, when the lip-sync value checked in the lip-sync table is 40 msec, the control unit 190 controls the video signal processing by delaying the DTS and PTS values of the input video frame by 40 msec. For example, in step S23, on the basis of the corrected DTS, the buffering of the compressed frame of the CPB unit 133 is delayed, and the decoding time point of the compressed frame of the video decoder 135 is delayed. In addition, in step S24, the output time point of the decoded frame in the DPB unit 137 is delayed on the basis of the corrected PTS. Through this method, the lip-sync mismatch problem between the video and audio due to the signal processing delay of the external speaker 200 may be solved.

Meanwhile, the operation method of the image display device 100 of the present disclosure may be implemented as processor-readable codes on a processor-readable recording medium provided in the image display device 100. The processor-readable recording medium includes all types of recording devices in which data readable by the processor is stored. Examples of the processor-readable recording medium include ROM, RAM, CD-ROM, magnetic tape, floppy disk, optical data storage device, and the like, and also includes those implemented in the form of carrier waves such as transmission over the Internet. In addition, the processor-readable recording medium is distributed in a computer system connected to a network, so that the processor-readable code may be stored and executed in a distributed method.

In addition, in the above, the preferred exemplary embodiments of the present disclosure have been illustrated and described, but the present disclosure is not limited to the specific exemplary embodiments described above. In the present disclosure, various modifications may be possible by those skilled in the art to which the present disclosure belongs without departing from the spirit of the present disclosure claimed in the claims, and these modifications should not be understood individually from the technical ideas or prospect of the present disclosure.

The invention claimed is:

1. A lip-sync correction method of an image display device, the method comprising:
    receiving an audio delay measurement command from a user;
    transmitting an audio detection command to a remote control device and outputting a pre-stored test signal to an external speaker;
    calculating an audio delay value by comparing an audio signal received from the remote control device with the test signal;
    correcting a decoding time stamp of an image signal on the basis of the audio delay value;
    storing a lip-sync table related to lip-sync values respectively corresponding to external input sources;
    correcting the lip-sync values respectively corresponding to the input sources on the basis of the audio delay value,
    wherein the correcting of the decoding time stamp corrects the decoding time stamp on the basis of the corrected lip-sync value; and
    delaying buffering of a compressed frame and a decoding time point of the compressed frame on the basis of the corrected decoding time stamp.

2. The method of claim 1, further comprising: delaying an output time point of a video frame by correcting a presentation time stamp on the basis of the corrected lip-sync values.

3. The method of claim 2, further comprising:
    checking the input sources and correcting the decoding time stamp and the presentation time stamp on the basis of the lip-sync values respectively corresponding to the input sources,
    wherein each input source comprises at least any one of respective types of the input sources and external devices providing the input sources.

4. An image display device, comprising:
    a signal receiving unit configured to receive a video signal and an audio signal from outside;
    a video processing unit configured to process the received video signal;
    an audio processing unit configured to process the received audio signal;
    a user input interface unit configured to communicate with a remote control device;
    an audio connection unit configured to output the audio signal processed by the audio processing unit to an external speaker;
    a storage unit configured to store a test signal; and a control unit configured to transmit an audio detection command to the remote control device and control the test signal to be output to the external speaker when an audio delay measurement command is input from the remote control device, calculate an audio delay value of the external speaker by comparing the audio signal received from the remote control device with the test signal, and correct a decoding time stamp of the video processing unit on the basis of the audio delay value;
    wherein the video processing unit comprises:
        a parsing unit configured to parse an input video stream to extract the decoding time stamp, a presentation time stamp, and the compressed frame;
        a coded picture buffer (CPB) unit configured to receive and temporarily store the compressed frame output from the parsing unit;
        a video decoder configured to sequentially generate a frame by decoding the compressed frame output from the CPB unit; and
        a decoded picture buffer (DPB) unit configured to temporarily store the decoded frame and output the decoded frame to the display unit, and
    the control unit controls buffering of the CPB unit and a decoding time point of the video decoder by correcting the decoding time stamp on the basis of the audio delay value;
    wherein the control unit controls a frame output time point of the DPB unit by correcting the presentation time stamp on the basis of the audio delay value.

5. The image display device of claim 4, wherein the storing unit stores a lip-sync table related to lip-sync values respectively corresponding to external input sources, and
    the control unit corrects each lip-sync value corresponding to respective input sources on the basis of the audio delay value so as to store each corrected lip-sync value in the lip-sync table, and corrects the decoding time stamp and the presentation time stamp on the basis of lip-sync values stored in the lip-sync table.

6. The image display device of claim 5, wherein each input source comprises at least any one of respective types of the input sources and external devices providing the input sources, and
    the control unit checks the input sources and corrects the decoding time stamp and the presentation time stamp on the basis of the lip-sync values respectively corresponding to the input sources.

7. The image display device of claim 6, wherein the lip-sync table is provided for a type of the audio connection unit and for the external speaker connected to the audio connection unit.

8. The image display device of claim 6, further comprising:
    a UI generating unit configured to generate a menu screen related to audio delay measurement; and
    a user input interface unit configured to communicate with the remote control device,
    wherein the UI generating unit controls to generate the menu screen related to the audio delay measurement when the menu display command related to lip-synching is input from the remote control device, and transmits the audio detection command to the remote control device when the audio delay measurement command is input.

9. The image display device of claim 8, wherein the test signal comprises an audio stream, and
    the control unit calculates, as the audio delay value, a difference between an output time point of the preset audio stream and an output time point of the audio signal received from the remote control device.

10. The image display device of claim 8, wherein the test signal comprises an audio stream and the video stream, and
    the control unit outputs the test signal according to the preset lip-sync values and calculates, as the audio delay value, the difference between an output time point of the preset audio stream and an output time point of the audio signal received from the remote control device.

11. An image display system, comprising:

an image display device configured to transmit an audio detection command to a remote control device and output a pre-stored test signal to an external speaker when an audio delay measurement command is input from the remote control device, calculate an audio delay value of the external speaker by comparing an audio signal received from the remote control device with the test signal, and correct a lip-sync value of an image signal on the basis of the audio delay value;

wherein the display device comprises:

a parsing unit configured to parse an input video stream to extract the decoding time stamp, a presentation time stamp, and the compressed frame;

a coded picture buffer (CPB) unit configured to receive and temporarily store the compressed frame output from the parsing unit;

a video decoder configured to sequentially generate a frame by decoding the compressed frame output from the CPB unit; and a decoded picture buffer (DPB) unit configured to temporarily store the decoded frame and output the decoded frame to the display unit, and the control unit controls buffering of the CPB unit and a decoding time point of the video decoder by correcting the decoding time stamp on the basis of the audio delay value;

wherein the control unit controls a frame output time point of the DPB unit by correcting the presentation time stamp on the basis of the audio delay value;

the external speaker configured to receive the test signal and output the test signal as the audio signal; and the remote control device configured to convert the audio signal detected through a microphone for a preset time into a wireless data signal and transmit the converted wireless data signal to the image display device when the audio detection command is input from the image display device.

* * * * *